No. 794,052.

Patented July 4, 1905.

UNITED STATES PATENT OFFICE.

OTTO SOHST, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

ORANGE-RED ACRIDIN DYE.

SPECIFICATION forming part of Letters Patent No. 794,052, dated July 4, 1905.

Application filed August 31, 1904. Serial No. 222,836.

*To all whom it may concern:*

Be it known that I, OTTO SOHST, Ph. D., chemist, a citizen of the Empire of Germany, residing at Höchst-on-the-Main, Germany, have invented certain new and useful Improvements in the Manufacture of Orange-Red Dyestuffs of the Acridin Series, of which the following is a specification.

I have found that the orange-yellow acridinium dyestuffs or their leuco compounds derived from acridin-yellow and obtained, for instance, by the action of hydrochloric acid and alcohol on leuco acridin-yellow may be transformed into orange-red dyestuffs if heated in an open vessel with formaldehyde in concentrated sulfuric acid.

Nothing has hitherto been known about the action of formaldehyde and concentrated sulfuric acid on acridinium compounds. In German Patent No. 135,771 new acridin dyestuffs have been described, which may be obtained by heating under pressure acridin-yellow or alkylated acridin dyestuffs with formaldehyde and diluted mineral acids. An essential difference exists, however, between this process and that referred to. According to this process the dyestuffs are heated with concentrated sulfuric acid in an open vessel, while according to the German Patent No. 135,771 the operation occurs with dilute mineral acid (hydrochloric acid) in a closed vessel under pressure. It is further stated in said patent that for one molecular proportion of dyestuff one molecular proportion of formaldehyde is to be used, and if more formaldehyde be used insoluble by-products are formed. Now according to this process at least two or three molecular proportions of formaldehyde may be employed, yet no formation of insoluble by-products occurs. By the different procedure a new result is obtained, inasmuch as dyestuffs of much redder shade can be produced than by the process of said patent.

Example: Fifty kilos of the dyestuff (salt or base) or its leuco compound, obtained by alkylating acridin-yellow with hydrochloric acid and alcohol, are dissolved in about five hundred kilos of sulfuric acid of 66° specific gravity, to which are added at about 50° centigrade thirty to fifty kilos of formaldehyde, the whole being heated for about one hour to 150° centigrade to 170° centigrade, while stirring. When cold, the solution is poured into fifteen hundred liters of water, and small quantities of a brownish dyeing dyestuff are salted out with about two hundred kilos of common salt. The whole is then filtered, and from the filtrate the dyestuff is completely precipitated by adding about one hundred kilos of zinc chlorid and sufficient alkali until the greater part of the sulfuric acid is neutralized.

When dry, the dyestuff is a brown-red powder easily soluble in water with an orange-yellow color, dyeing cotton treated with tannin and leather orange-red shades. With concentrated sulfuric acid a yellow solution of a decided green fluorescence is obtained, which on adding little water turns orange and on adding much water becomes red. In alcohol the dyestuff is difficultly soluble with an orange-red color insoluble in ether, benzene, and ligroin.

The dyestuff is not uniform, but consists for the greater part of an acridinium and for the rest of an acridin dyestuff, which owing to their different behavior toward ammonia may be easily separated. Whether this acridinium dyestuff is identical with the highly-alkylated one described in said patent and obtained by means of concentrated sulfuric acid and menthyl-alcohol could hitherto not be proved with certainty.

Having now described my invention, what I claim is—

1. The herein-described process for the manufacture of orange-red dyestuffs, which consists in heating to a high temperature with concentrated sulfuric acid and formaldehyde the products obtained by alkylating leuco acridin-yellow with hydrochloric acid and alcohol, substantially as set forth.

2. As new products, the orange-red dyestuffs obtained by heating to a high temperature with concentrated sulfuric acid and formaldehyde the products obtained by alkylating leuco acridin-yellow with hydrochloric acid and alcohol, being brown-red powders, soluble in water with an orange-yellow color and dyeing cotton treated with tannin and leather orange-red shades, yielding with concentrated sulfuric acid a yellow solution of decided green fluorescence, which on adding little water turns orange and on adding much water becomes red; in alcohol the dyestuff is difficultly soluble with an orange-yellow color, insoluble in ether, benzene and ligroin.

In testimony that I claim the foregoing as my invention I have signed my name in presence of two subscribing witnesses.

OTTO SOHST

Witnesses:
　ALFRED BRISBOIS,
　BERNHARD LYDECKER.